P. J. MURPHY.
PORTABLE FOLDING BOAT.
APPLICATION FILED MAR. 13, 1908.
907,629.
Patented Dec. 22, 1908.
2 SHEETS—SHEET 2.
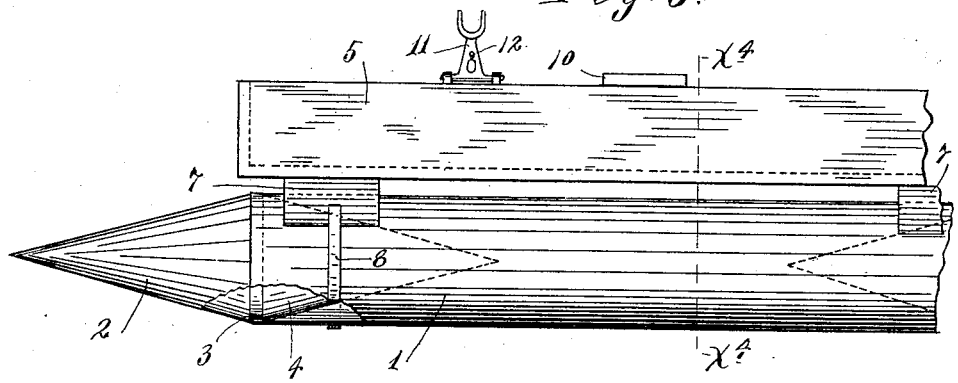
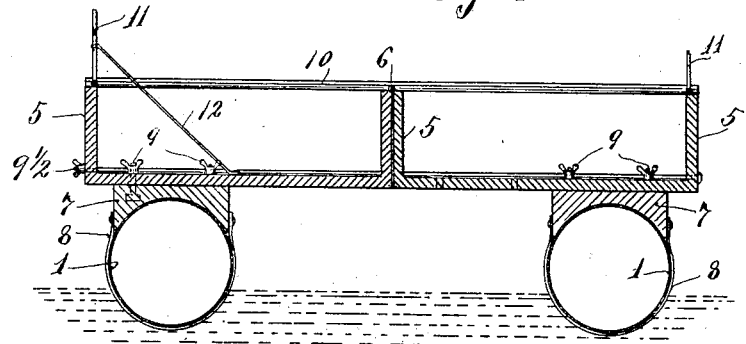
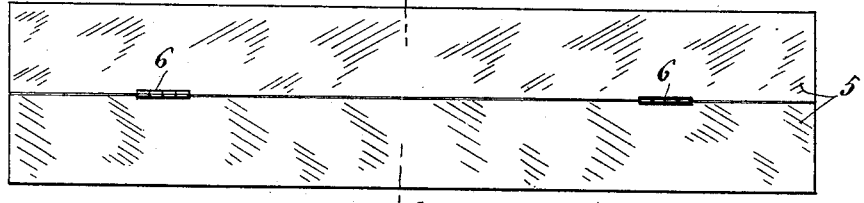
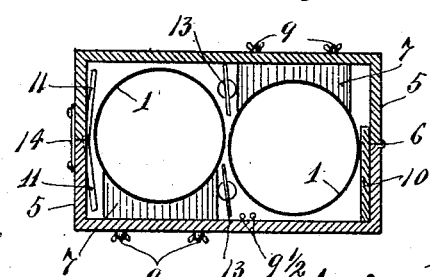
Witnesses.
A. H. Opsahl.
M. L. Roney.
Inventor.
P. J. Murphy.
By his Attorneys
Williamson & Merchant

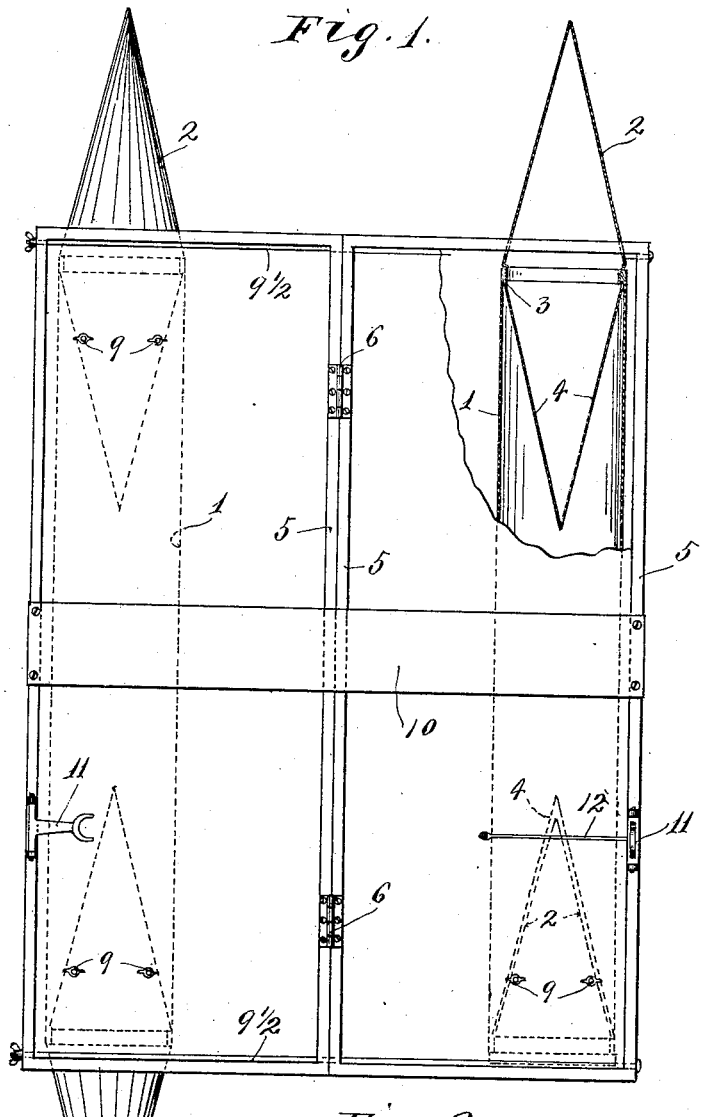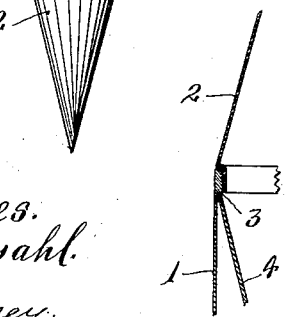

UNITED STATES PATENT OFFICE.

PAUL J. MURPHY, OF MINNEAPOLIS, MINNESOTA.

PORTABLE FOLDING BOAT.

No. 907,629.　　　　　Specification of Letters Patent.　　　　Patented Dec. 22, 1908.

Application filed March 13, 1908. Serial No. 420,848.

*To all whom it may concern:*

Be it known that I, PAUL J. MURPHY, a citizen of the United States, residing at Minneapolis, in the county of Hennepin and State of Minnesota, have invented certain new and useful Improvements in Portable Folding Boats; and I do hereby declare the following to be a full, clear, and exact description of the invention, such as will enable others skilled in the art to which it appertains to make and use the same.

My invention has for its object to provide an improved portable folding boat, especially adapted for use in hunting and other similar purposes where compactness and lightness are essential for convenience in handling the boat, when making portages or in shipment to the point desired.

To these ends, my invention consists of the novel devices and combinations of devices hereinafter described and defined in the claims.

The invention is illustrated in the accompanying drawings wherein like references refer to like parts throughout the several views.

In said drawings: Figure 1 is a plan view of the boat, with the parts in working position, some portions being broken away and others shown in section. Fig. 2 is a detail in longitudinal section, showing the joint between the body and one of the end sections of one of the hulls. Fig. 3 is a side elevation, with the parts in the position shown in Fig. 1, some parts being broken away. Fig. 4 is a cross section, on the line $x^4\ x^4$ of Fig. 3. Fig. 5 is a side elevation of the box-like folding frame in its folded position, or as required for housing the hulls and working parts; and Fig. 6 is a cross section, on the line $x^6\ x^6$ of Fig. 5.

The numerals 1 and 2 represent, respectively, the body and end portions of a pair of hollow hulls preferably made of light galvanized iron, but which may be made of other suitable material. The body portions 1 are shown as composed of closed cylinders, and the end sections 2 are shown as composed of hollow cones which are detachably connected to the ends of the cylinders 1 by screw-threaded joints 3, or other suitable means, and are adapted, when reversed, to telescope within said cylinders 1 outward of the cylinder heads or closures 4. The cylinder heads or closures 4 are of conical form and are mounted with their small ends pointing inward; and hence the conical end sections 2 of the hulls can, when reversed, be telescoped therein so as thereby to considerably shorten the length of the hulls when in packing position. One of the end sections 2 of the hulls is shown in this reversed or packing position, in Fig. 1 of the drawings. The special reason for providing the cylinders 1 with the tight heads or closures 4 is to make the same water-tight independently of the character of the joint between the hull sections 1 and 2.

The numeral 5 represents a box-like folding frame, of a little greater length than the hull cylinders 1, and formed in two longitudinal sections abutting and connected by the hinges 6. When the frame is in its open position, as shown in Figs. 1, 3 and 4, it is rigidly connected to the hull cylinders 1, with the latter suitably spaced apart from each other, by means of bearing blocks 7 fixed to said cylinders by sheet iron straps 8, or other suitable means, and detachably connected to the bottom of said box-like frame by thumb nut screw bolts 9.

The numerals $9\frac{1}{2}$ represent a pair of draw tie rods which, when the frame is in its open position, are passed through all the sideboards of the frame section and drawn up tight by the thumb nuts applied to the screw-threaded ends of the same, as shown in Figs. 1 and 4; and which serve to rigidly hold the frame sections in their open position and to prevent any buckling thereof on their hinge joints.

The numeral 10 represents a seating board detachably secured to the side-boards of the frame section and serving as a seat for the oarsmen or other occupants of the boat, and also to assist in bracing the frame sections in their open position.

A pair of oarlocks 11 are hinged one to each side of the folding frame 5, the oarlocks 11 are held in their upright position by brace rods 12.

It must be obvious that, when the parts are rigidly connected together, as shown in Figs. 1, 3 and 4, they form a catamaran adapted to be propelled by oars 13 in the hands of one or more oarsmen seated on the cross-board 10. Said oars 13 are held in working position by the oarlocks 11.

To pack the parts for portage, shipment or storage; the frame is separated from the hulls; the tie rods $9\frac{1}{2}$ are withdrawn and the seating board 10 detached and these parts placed within one section of the frame; the oar-lock braces detached and laid down in one section of the frame and the oar-locks permitted to fold downward and inward against the sides of the frame; the end sections of the hulls are detached, reversed and telescoped within the hull cylinders, and the telescoped hulls placed within one of the box-like frame sections and bolted thereto, if desired, with the oars in the spaces between the hulls, one above and one below the same; and the two sections of the box-like frame are then folded together and locked by hook 14, thereby bringing all the parts into the position shown in Fig. 6. The frame is enough longer than the hull cylinders 1 to receive the hulls when the end sections 2 are telescoped in the cylinders 1. The working parts will all thus be packed within a box-like case of comparatively small size adapted to be conveniently handled for portage, shipment or storage.

The frame 5, the bearing blocks 7, and the cross-board or seat 10 are all preferably made of wood. As before stated, the hulls are preferably of thin galvanized iron. Hence the whole structure is comparatively light, and of a form affording great buoyancy when the parts are in working position for use as a catamaran. It will, however, be understood that all the parts might be made of other suitable material. For example, the hulls might be made of papier-mâché.

What I claim is:—

1. A portable folding boat, comprising a body portion and a pair of hulls secured thereto, in the form of hollow cylinders having inwardly projecting conical seats and detachable outwardly projecting conical ends, which latter when turned inward are adapted to be contained within said conical seats, substantially as described.

2. In a portable folding boat, the combination with a folding box-like frame adapted to house the hulls and the working parts when detached and placed therein, of a pair of hulls each composed of a hollow cylinder having detachable and reversible cone-shaped end sections adapted to telescope therein, when reversed, to reduce the housing length of the hulls the bodies of which are of less length than said box-like frame, substantially as described.

3. In a portable folding boat, the combination with a pair of hulls, of a folding box-like frame formed in two longitudinal sections hinged together, a cross-board detachably securable to the frame sections for rigidly holding the same in their open position and affording a seat for the oarsmen, and means for detachably connecting the open frame to the said hulls to form a catamaran, and said frame being adapted to house the hulls and the working parts when detached and placed therein and the frame sections are folded together, substantially as described.

4. The combination with the closed hull cylinders 1 having the detachable conical end sections 2 adapted, when reversed, to telescope therein, the box-like folding frame composed of the two longitudinal sections 5 hinged together, the tie rods $9\frac{1}{2}$, the cross-board 10, the bearing blocks 7, straps 8 and bolts 9, the folding oar-lock 11 and braces 12, all for coöperation, substantially as described.

In testimony whereof I affix my signature in presence of two witnesses.

PAUL J. MURPHY.

Witnesses:
H. D. KILGORE,
M. E. RONEY.